United States Patent [19]

Batey

[11] Patent Number: 4,973,915
[45] Date of Patent: Nov. 27, 1990

[54] FEED FORWARD DIFFERENTIAL EQUALIZER FOR NARROWING THE SIGNAL PULSES OF MAGNETIC HEADS

[75] Inventor: Robert M. Batey, Eagle, Id.
[73] Assignee: Hewlett-Packard Company, Palo Alto, Calif.
[21] Appl. No.: 434,657
[22] Filed: Nov. 13, 1989
[51] Int. Cl.⁵ .......................... H03F 3/04; H04N 9/20
[52] U.S. Cl. .................................. 330/151; 330/304; 360/46; 360/65
[58] Field of Search .................. 330/151, 304; 333/18, 333/28 R; 360/45, 46, 65

[56] References Cited

U.S. PATENT DOCUMENTS 4,479,152 10/1984 Chi ........................................ 360/46
4,786,989 11/1988 Okamura et al. ...................... 360/65

Primary Examiner—James B. Mullins
Attorney, Agent, or Firm—E. F. Oberheim

[57] ABSTRACT

Magnetic head signal slimming is achieved using a differential, low order, lumped element, LC ladder network, having a single adjustment, differential feed forward equalization circuit, to provide pulse slimming and a variable, peaked amplitude response without varying the delay (phase) response of the network. The feed forward adjustment is easily varied by selection of the control signal input thereto so that the network gain and the slimming or pulse narrowing of the network is tailored for the difference in pulse widths produced by magnetic heads, which vary over the surface of the magnetic media and which vary from one magnetic head to another.

6 Claims, 4 Drawing Sheets

GROUP DELAY (SEC) vs FREQ IN Hz

MAGNITUDE (dB) vs FREQ. IN Hz

MAGNITUDE (dB) vs FREQ. IN Hz

FEED FORWARD DIFFERENTIAL EQUALIZER FOR NARROWING THE SIGNAL PULSES OF MAGNETIC HEADS

TECHNICAL FIELD

This invention relates generally to signal processing for a magnetic head and more particularly to pulse slimming techniques for minimizing pulse interference among consecutive pulses.

BACKGROUND OF THE INVENTION

Pulse slimming equalization techniques are effective and necessary in increasing the magnetic recording density of magnetic transitions in magnetic media by reducing intersymbol interference. Signal processing to slim the readback pulses to minimize interference among adjacent pulses in a pulse train derived from high density, high transfer rate regions of the media, increases readback reliability.

Investigations to improve magnetic recording or readback resolution have been reported for many years. Examples of such investigations appear in reports by; H. M. Sierra, "*Increased Magnetic Recording Readback Resolution by Means of a Linear Passive Network*", IBM J. RES. DEVELOP, Vol. 7, pages 22–23, January 1963; by G. B. Jacoby, "*Signal Equalization In Digital Magnetic Recording*", IEEE Transactions on Magnetics, Vol. MAG-4, No. 3, September 1963, and J. C. Vermdulen, "*Read Pulse Compression by Linear Filtering*", IBM Technical Disclosure Bulletin, Vol. 9, No. 10, pages 1272–1273, March 1967.

Richard C. Schneider, in a paper entitled, "*An Improved Pulse Slimming Method for Magnetic Recording,*", IEEE Transactions Magnetics Vol. MAG.-11, No. 5, pages 1240–1241, September 1975, describes an equalizer in a mass storage system comprising active circuit elements in two or more cascaded stages for slimming the pulse leading edge and the pulse trailing edge in sequence. When an integrator is used at the last pulse slimming stage to obtain zero crossings, it is noted that undesired negative side lobes or signal overshoot can be kept away from the base line.

T. Aikawa et al, in a paper entitled "*An Experimental Study of Signal Equalization for Thin Film Heads*", IEEE Transactions on Magnetics, Vol. MAG.-22, No. 5, pages 1209–1211, September 1986, describes two techniques of reducing negative side lobes in signal processing for thin film heads. One is an equalizer providing pulse slimming and elimination of negative side lobes. The equalizer is called a double cosign equalizer. Two consecutive delay lines are used to reduce the side lobes. The double cosign equalizer is said to increase signal amplitude and decrease the ripples. The other way of reducing ripples which is described is to provide a head with asymmetrical pole faces.

Robert Kost et al, discusses passive LC filters in a paper entitled "*Arbitrary Equalization with Simple LC Structures*", IEEE Transactions on Magnetics, Vol. MAG-17, No. 6, pages 3346–3348, November 1981. The design of the output signal is presented in connection with a system using amplitude thresholding and signal peak detection. The design process for all-pole, LC ladder filters using two filter models is presented, comparing an insertion loss circuit realization with a multi-input circuit realization. The paper mentions a filter design, which is not illustrated, referred to as an equalizer to remove intersymbol interference in the time derivative of the slimmed output pulse. SPICE simulations of an input pulse and a slimmed output pulse, displaced in time, are presented.

Differential equalizers are not referenced in any of these papers. Aikawa et al would be forced to use matched delay lines for noise cancellation in pulse slimming. The use of a differential network, as provided in accordance with this invention is not treated in these papers. Delay line equalization, as proposed by Aikawa, is not readily adapted to a differential configuration. The delay lines are complex and are difficult to match.

Independent slimming of the pulse leading and trailing edges using consecutive active stages, as proposed by Schneider, is also complex and not easily or effectively adapted to a differential type of network configuration. Four interacting active circuit adjustments are required in the differential network.

The approach taken by Kost et al to achieve signal equalization using LC filters requires current inputs, FIG. 2b, which are difficult to adjust. One drive input and two feed forward, or gain controls, are shown. These also interact in the network. The gain controls require independent adjustments. The concept of injecting currents into nodes of an LC ladder network is not compatible with simplicity in signal slimming where multiple magnetic heads of differing gain in relation to one another and with respect to the magnetic media are employed.

These papers present a brief review of passive and active pulse equalization of the prior art presently known to the applicant, which is relevant to pulse slimming techniques in high density magnetic media storage systems.

The patents discussed below represent the results of a search for prior art with respect to this invention. In general, the relevance of these patents resides in applications of LC networks in processing signals derived from transducers in read back systems.

U.S. Pat. No. 4,208,634, Peek et al, describes a circuit for suppressing pulse shaped noise caused by scratches on a phonograph disk. This circuit is relevant only in the sense that an LC network is employed. Pulse slimming is not referred to.

U.S. Pat. No. 4,244,008, Holt, describes a read back circuit for a transducer scanning a floppy disk which employs a frequency equalizer comprising a differential LC filter coupled to the input of a differentiating amplifier. The thrust of this disclosure is in the use of a track counter to control both circuits in the equalizer, to compensate peak shifting in readback.

U.S. Pat. No. 4,276,573, Halpern et al, describes a pulse shaping network for a transducer in a disk memory system which employs a capacity terminated, parallel cascade of LC filters, functioning as a sine pulse forming filter. The system is directed to reducing intersymbol cross talk, for the purpose of equalizing peak amplitudes and correcting peak phase shifts. Intersymbol cross talk is reduced using a network transfer function consisting of first and third half-period harmonics for optimizing pulse slimming.

U.S. Pat. No. 4,327,383, Holt, describes the use of an equalizing filter in a circuit having a transducer for reading digital data from a record medium. The equalizing filter has a response in a frequency domain expressed by a specific Laplace transform providing a substantially linear time delay and an acceptable gain rise in frequency ranges associated with tracks having higher packing densities, such as the middle to inner disk tracks. A track counter switches the outer track signals around the equalizing filter into the output which includes a low pass LC filter and a detector.

U.S. Pat. No. 4,344,093, Huber, describes a readback circuit including a transducer circuit for detecting data recorded on a magnetic medium and an optimum equalizer circuit receiving its input from the transducer circuit. The optimum equalizer is implemented by a passive LC, balanced ladder network, depicted as an eight pole filter. The non linear phase delay of the optimum equalizer is compensated by a second delay equalizer which is implemented by an all pass lattice network of capacitor inductor sections cascaded together. It is stated that the input read signal is transformed into a data representative signal which has improved signal to noise ratio performance and limited pulse widths.

U.S. Pat. No. 4,506,236, Cloke, describes an open-ended composite filter/differentiator which is used in the read/write channels of a disk drive system, for producing an even function and an odd function of a transfer function supplied thereto. A resistor is connected in series with an energy source and an LC network has its input coupled across the energy source and the resistor. Odd functions are derived across the resistor and even functions are derived across the capacitor terminated output of the LC network.

These patents describe various techniques for pulse shaping including LC ladder networks several of which, Huber and Halpern et al reference pulse slimming all, except Cloke, involve complex read/write channels. Some require switching, the two Holt patents, to control inputs or to change network frequency. Cloke requires zero crossing and threshold detectors together with qualification logic to process the odd/even transfer functions.

With continuing needs for the reduction in size coupled with increases in mass storage in such magnetic storage systems, higher recording densities and consequent pulse compression for writing and reading are required using circuits of simpler concept for pulse slimming and gain control.

DISCLOSURE OF THE INVENTIONS

This invention provides improvement over prior art systems such as those referenced above, in the provision of a simple, low order, lumped element, singly terminated, LC ladder network of differential design, utilizing a differential method of feed forward pulse equalization. This single channel filter network provides a variable peak amplitude response without varying the delay (phase) response of the network. The readback pulses generated by the transducer which scans the magnetic transitions at the media, are made sufficiently narrow so that interaction and consequent distortion among adjacent pulses is obviated.

Provision is made for varying or controlling the network so that the amount of pulse narrowing allowed is tailored for the difference in pulse widths produced by a transducer at different locations in scanning the media and pulse width variations from one transducer to another among plural transducers in mass storage systems.

This single channel filter offers improvements and advantages in that it is fully differential. The LC ladder network comprises only a few sections, rather than a complex delay element, requiring only a few elements for implementation. Only one input is required for pulse amplitude adjustment. Phase adjustment and amplitude adjustments are made independently.

The ladder network is unterminated, that is, unloaded at its output. The network is provided with a finite impedance differential termination at its input. The differential configuration of this LC ladder network prevents signal interference in the output circuit and cancels noise in its differential branches. Only a single adjustment of gain is required to provide a variable amplitude response. Since amplitude response and phase response are independent of one another, the phase response is constant in the presence of gain adjustments. Gain adjustments are made using a feed forward network coupled from the input to the output of the LC ladder network.

BEST MODE FOR CARRYING OUT THE INVENTION

Figure 1:
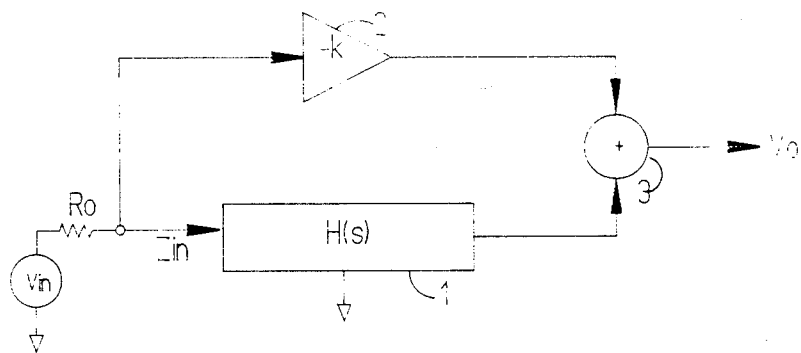
FIG. 1 is an elementary block diagram of an analytical model of a non-differential feed forward, slim filter network, using a linear phase filter, embodying certain principles of this invention.

FIG. 1 when broadly construed to include delay lines, represents prior art, but when narrowly construed to include only LC channel filters, usefully depicts an analytical model of a channel filter for demonstrating certain principles of this invention. The purpose of the invention is to narrow the readback pulses of a transducer, such as a magnetic head in a disk drive, for example, so that adjacent pulses in a pulse train do not interfere with one another to cause pulse distortion. This invention employs a differential network rather than a single sided or singly terminated model as in FIG. 1, however, the principles considered at this point are simpler to model, using a computer, and to demonstrate in the form illustrated. These principles are the pulse slimming and the feed forward response of the network which are discussed in some detail with respect to FIG. 2.

In FIG. 1, the channel filter comprises a passive circuit 1 which is an LC ladder filter network, for example, having a transfer function denoted H(s). The channel filter has a singly terminated finite input impedance designated $Z_{in}$ and an output which is substantially electrically unloaded and therefore of very high impedance. An input voltage pulse, $V_i$, from a voltage source 4 is coupled to the input of the circuit 1 via a resistor, $R_O$. The circuit 1 functions as a delay element in which the delay is a direct function of the number of poles of the ladder network, that is, the delay increases as the number of poles in the ladder network increases.

A feed forward gain control amplifier 2 in the channel filter is coupled from the input of the filter circuit 1 to the output. The amplifier 2 has a gain which is designated, $-k$. The outputs of the amplifier 2 and the filter circuit 1 are algebraically summed in a summing junction 3, a resistor, for example, to produce the output voltage $V_O$. The output voltage $V_O$ of the network is defined by:

$$V_0 = \frac{Z_{in}}{R_0 + Z_{in}} (H(s) - k) V_i \quad (1)$$

From equation 1, the gain of the network is next derived in terms of volts per volt. This is expressed in equation 2 below:

$$\frac{V_0}{V_i} = \frac{Z_{in}(H(s) - k)}{R_0 + Z_{in}} \quad (2)$$

$$\text{LET } \frac{Z_{in}}{R_0 + Z_{in}} \cdot H(s) = G(s) \quad (3)$$

$$\frac{V_0}{V_i} = G(s) - \frac{Z_{in}}{R_0 + Z_{in}} k \quad (4)$$

In equation 3, $G(s)$ represents the transfer function $H(s)$ of the network 1 combined with the input and expresses the gain of the network due to the transfer function $H(s)$ in volts per volt.

In equation 4, which defines the gain of the entire network, the last term defines the feed forward gain due to the gain, $-k$, of the feed forward, gain control amplifier 2 in volts per volt.

From the foregoing considerations and with reference particularly to equation 1, it can be shown that the number of zeros in the numerator is equal to or less than the number of poles in the denominator. From this it is evident that the "order" of pulse slimming is controlled by the order of the transfer function $H(s)$.

Figure 2:
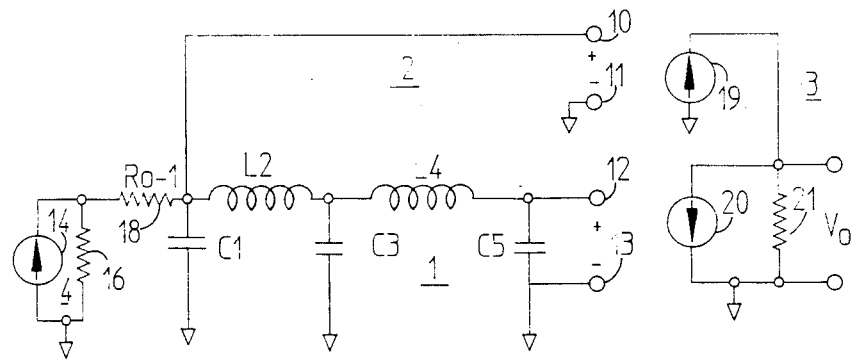
FIG. 2 is a more detailed schematic illustration of a computer model of a non-differential network of the type of FIG. 1.

A feed forward channel filter which is a computer model of the analytical model of FIG. 1, is illustrated in FIG. 2. This too is a single sided, single ended filter. It is shown in greater detail than in FIG. 1 and like FIG. 1 has a finite impedance input termination and an unterminated or unloaded output. Feed forward is represented simply in a feed forward circuit 2 coupled between the finite impedance input termination and the output, where it is combined with the output of the ladder network 1.

The network 1 is a five pole, LC ladder filter comprising capacitors C1, C3, C5 and inductors L2 and L4. The unterminated output of the network 1 appears across the capacitor C5 at terminals 10 and 11. The output due to the feed forward gain is at terminals 12 and 13. Voltage input to the network from the voltage source 4 is supplied by a current source 14 coupled across a resistor 16 to ground. The output voltage from this voltage source is coupled to the input of the LC ladder network by a resistor 18, the transfer characteristic of which is expressed as $R_O-1$, in which $R_O$ represents the value of the resistor in ohms.

Network outputs and the summing of such outputs is represented in the summing circuit 3. This circuit comprises current sources 19 and 20 representing network outputs at terminal pairs 10, 11 and 12, 13, respectively. These current sources are coupled across an output resistor 20 for algebraically summing the currents. The output voltage is $V_O$.

The values of the circuit elements used in the computer modelling of the circuit of FIG. 2 are given below.

Figure 3:
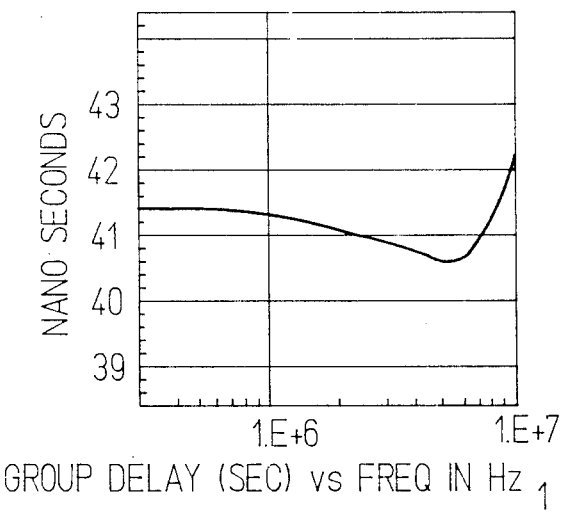
FIG. 3 depicts a computer plot of the phase response of the LC network of FIG. 2.

$R_O = 100\ \Omega$
$C1 = 39$ F
$L2 = 0.983\ \mu H$
$C3 = 134.4$ F
$L4 = 1.66\ \mu H$
$C5 = 241$ F A computer plot of the channel filter phase response is presented in FIG. 3. Computer plots of pulse magnitude or amplitude response are presented in FIGS. 4 and 5. A computer plot of pulse slimming is presented in FIG. 6.

The computed phase response of the computer model of FIG. 2, in FIG. 3, is a plot of group delay in the network (SEC) vs frequency in Hz. The ordinate scale is 1 ns per scale division and represents the delay in network phase response as a function of frequency. Since in this network, the feed forward gain is independent of the phase response, it is evident that FIG. 3 depicts phase response for any value of gain, k.

Figure 4:
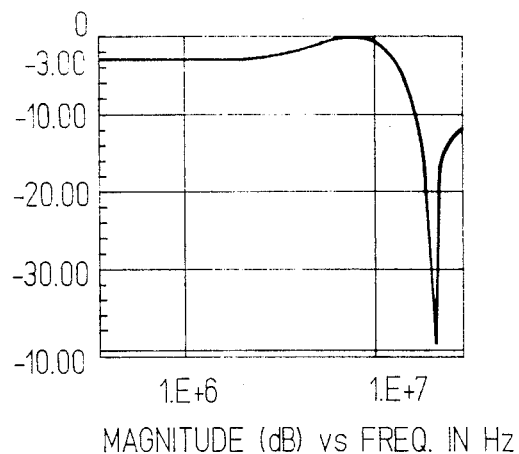
FIGS. 4 and 5 depict computer plots of magnitude response of the pulse outputs of the circuit of FIG. 2 for differing network gains.
Figure 5:
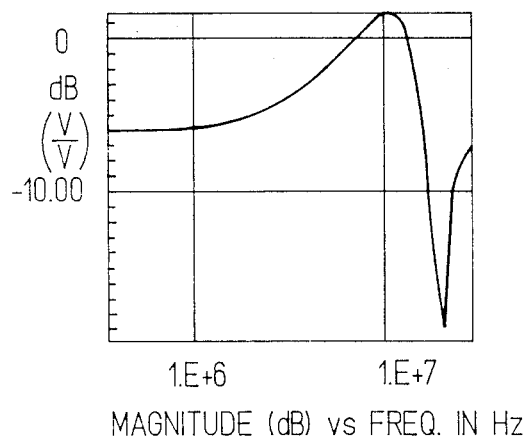

FIGS. 4 and 5 are computer plots of magnitude response for different gains, k. These are plots of magnitude in volts per volt (dB) vs frequency in Hz. In FIG. 4, the gain is $k = 0.3$. Magnitude in volts per volt shows a relatively flat response varying between $-3$ and $0$ dB over the frequency range to $1.E+7$ Hz, beyond which a deep notch develops over a dB range from 0 dB to about $-30$ dB.

At a gain of $k = 0.5$, as seen in FIG. 5, a peaked magnitude response results, ranging from $-6$ dB to 0 dB over the frequency range to $1.E+7$ Hz. Again a deep notch in magnitude occurs beyond that frequency.

Figure 6:
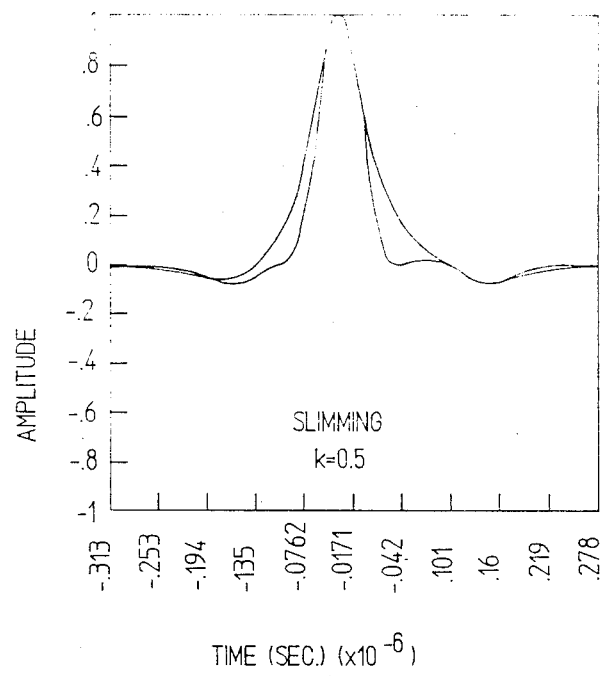
FIG. 6 depicts a computer plot of superimposed input and output signals of the computer model network of FIG. 2 showing signal slimming.

Pulse slimming, performed by the computer model of the channel filter at a gain of $k = 0.5$, is evident in the computer plot of FIG. 6. The input pulse IP is the computer plot for a thin film type of magnetic head scanning magnetic transitions in the surface of the magnetic memory disk. The slimmed pulse SP is plotted in a position which is inphase with the input pulse to provide a direct comparison of the bases of the pulses. The pulses are plotted in amplitude vs time. Amplitude is plotted in volts and time in seconds times $10^{-6}$.

The computer model demonstrates that a channel filter having a simple, low order, lumped element, singly terminated, unloaded output, ladder network, combined with a high impedance input, feed forward network, in which the outputs of the ladder network and feed forward circuit are algebraically combined in an unloaded channel filter output, provides pulse narrowing and peak amplitude pulse adjustment, in which phase adjustment and amplitude adjustment are independent of one another.

Figure 7:
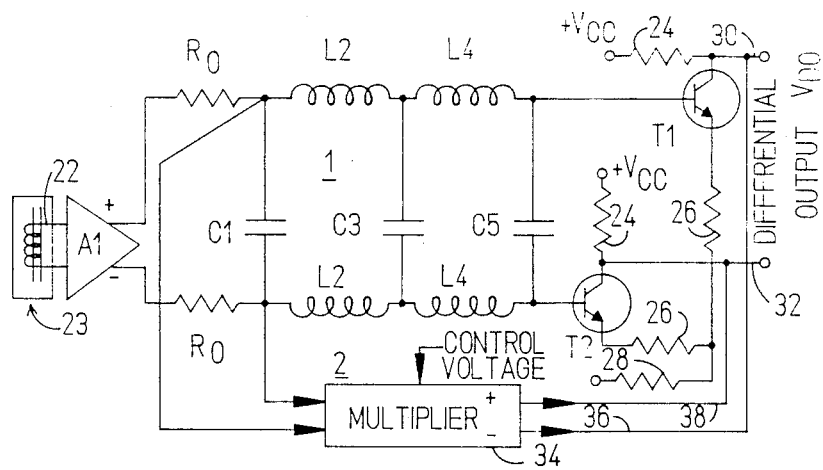
FIG. 7 is a schematic illustration of a fully differential feed forward slim filter network embodying the principles of this invention.

The implementation of this invention in a fully differential feed forward channel filter is illustrated in FIG. 7. This again is a channel filter having a single termination, but which in this case is a differential termination. It comprises a five pole differential ladder filter with an adjustable feed forward circuit branch, in which circuit elements corresponding to those of FIG. 2 bear like reference characters.

The finite input resistors $R_O$ in the dual ladder network circuit branches, provide the source impedance. Input to the network 1 from the voltage source 4 comprises the coil 22 of a magnetic transducer 23, for example, which is coupled via a differential amplifier A1, in which the outputs are marked + and −, to the respective resistors $R_O$. The differential input voltage appears across the capacitor C1 which is the first pole in the differential LC ladder network. The two signal circuit branches of the network, comprising the inductors L2 and L4 in each branch and terminating across the capacitor C5, are coupled to the bases of the transistors T1 and T2, respectively, providing a high input impedance and functioning jointly as a high impedance input, lower impedance output, differential amplifier. NPN transistors are illustrated, without limitation as to the type of transistors which may be employed. The transistor output circuits each comprise a collector resistor 24 and an emitter resistor 26. The emitter resistors are commonly coupled to a resistor 28. Power is supplied to these output circuits represented by a voltage between $+V_{cc}$ and ground. The differential output voltage $V_{DO}$ appears across the output circuit, comprising conductors 30 and 32, which are connected to the collectors of the transistors T1 and T2, respectively. This output circuit is effectively unloaded and is referred to as unterminated for that reason.

A variable, single adjustment, differential, feed forward voltage is algebraically coupled into the differential output of the network at conductors 30 and 32 by means of a multiplier 34 which multiplies an adjustable gain control voltage by the voltage with respect to ground at each end of the capacitor C1 located at the input to the LC network. The multiplier has a high impedance buffered input which may be a part of the multiplier or may be provided by an external differential amplifier (not shown) at the multiplier input. The multiplier is conventional. A commercially available model used in this circuit being type MC 1495.

The differential output of the multiplier 34 is the feed forward gain signal k. The gain signal k is coupled into the differential output circuit 3 by connecting the individual conductors 36 and 38 to conductors 30 and 32 respectively. The gain signal adds to or subtracts from the ladder network output depending upon the control voltage coupled to the multiplier. The LC network functions to control pulse narrowing or slimming and the feed forward gain circuit provides gain control by controlling the voltage output of the network (pulse amplitude) to provide a signal, originating at the transducer coil 22, which is within gain (amplitude) limits. In practice, in a disk drive, for example, there is one such pulse control network in each magnetic head circuit to provide pulse slimming and gain control tailored to each head.

Figure 8A:
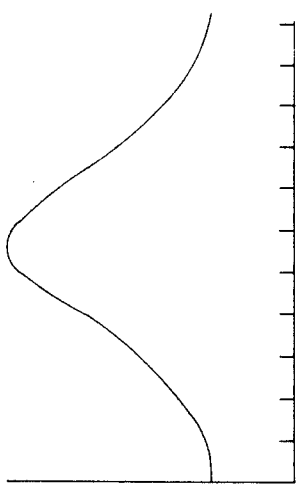
FIGS. 8a and 8b and 9a and 9b are plots of signal traces showing the test results of the differential LC network in FIG. 7 for two different sets of conditions.
Figure 9A:
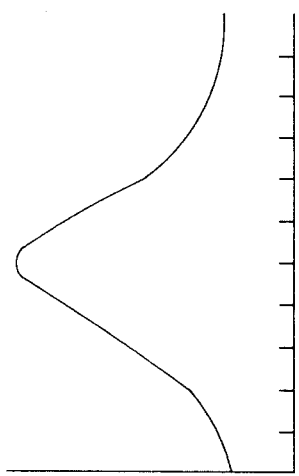
Figure 8B:
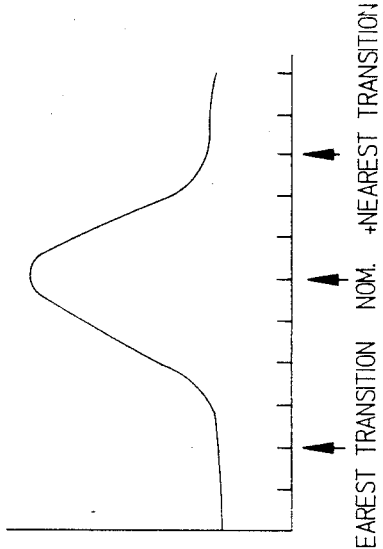
Figure 9B:
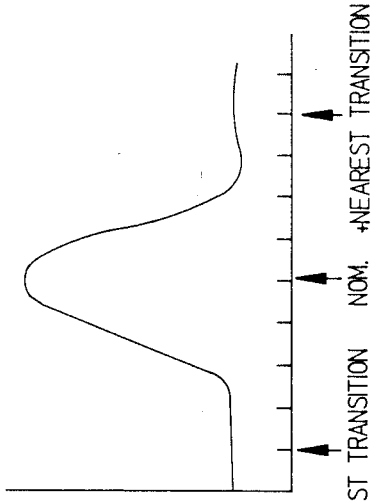

Tests conducted with a circuit embodying the organizational concept of the circuit of FIG. 7, for two different pulse widths developed by the magnetic head, in a disk drive, produced pulses which are traced in FIGS. 8a and 8b and 9a and 9b respectively. The circumferential edges, called transitions of the magnetic dibits producing the pulse, are indicated. The unslimmed magnetic head pulses are shown at FIGS. 8a and 9a. The slimmed pulses appear at FIGS. 8b and 9b. The pulses are plotted on an abscissa scale of 20 ns per scale division. The slimmed pulse at FIG. 8b has a pulse width of about 55 ns and the slimmed pulse at FIG. 9b has a pulse width of about 80 ns. Pulse slimming in each instance is sufficient to effectively eliminate interference with neighboring pulses.

INDUSTRIAL APPLICABILITY

The differential channel filter of this invention is applicable in pulse slimming and gain control applications in pulse trains developed in the magnetic circuits in dynamic mass memories such as magnetic disk drives.

What is claimed is:

1. A differential, feed forward, channel filter, comprising:
   a differential LC ladder network having a differential output for delivering narrowed output signal pulses;
   a differential feed forward circuit having a high impedance differential input coupled to said differential input of said LC ladder network for receiving signals therefrom, and a differential output coupled to said differential output of said LC ladder network; and
   means for varying the gain of said differential feed forward circuit to control the amplitude of said narrowed output signal pulses.

2. The channel filter according to claim 1, in which:
   said means for varying the gain of said feed forward circuit comprises a separate input signal circuit for adjusting the gain of said feed forward circuit.

3. The channel filter according to claim 2, in which:
   said feed forward circuit is a multiplier for multiplying signals from said input signal circuit with signals received from said differential input of said LC network.

4. The channel filter according to claim 3, in which:
   said differential input of said LC ladder network comprises two input circuits and said differential input of said multiplier comprises two circuits connected, respectively, to said two input circuits of said LC ladder network; and
   said multiplier multiplies a signal on each of said two input circuits of said multiplier with a signal on said separate input circuit.

5. The channel filter according to claim 4, in which:
   the signal on said separate input circuit of said multiplier has a value and a polarity to increase or decrease the differential output of said multiplier or to reverse the polarity of output of said multiplier to control the amplitude of said narrowed output signal pulse within signal pulse gain limits.

6. The channel filter according to claim 4, in which:
   said differential input of said LC ladder network comprises a differential amplifier having two amplifier input circuits for receiving thereacross said input signal pulses, and two amplifier output circuits, said two amplifier output circuits being connected, respectively, to said two input circuits of said LC ladder network.

* * * * *